United States Patent [19]

Andou et al.

[11] Patent Number: 4,885,218

[45] Date of Patent: Dec. 5, 1989

[54] BATTERY EXHAUST GAS PLUG FILTER AND PROCESS FOR MANUFACTURING THE SAME

[75] Inventors: Masayasu Andou, Anjo; Ichiro Tajima, Nagoya, both of Japan

[73] Assignee: Aisin Seiki Kabushiki Kaisha, Kariya, Japan

[21] Appl. No.: 159,599

[22] Filed: Feb. 24, 1988

[30] Foreign Application Priority Data

Feb. 24, 1987 [JP] Japan .................. 62-041099

[51] Int. Cl.⁴ .................. H01M 2/12; B05D 1/36
[52] U.S. Cl. .................. 429/53; 429/86; 427/243; 427/407.1; 427/419.8
[58] Field of Search .................. 429/53, 86, 243; 427/407.1, 419.8

[56] References Cited

U.S. PATENT DOCUMENTS

| | | | |
|---|---|---|---|
| 3,915,752 | 10/1975 | Gross | 429/86 |
| 3,925,093 | 12/1975 | Walsh | 106/287.13 |
| 4,636,446 | 1/1987 | Lee | 429/86 X |

FOREIGN PATENT DOCUMENTS

| | | |
|---|---|---|
| 0187276 | 12/1985 | European Pat. Off. |
| 165954 | of 1986 | Japan. |
| 161656 | 2/1986 | Japan. |
| 61-250668 | 11/1986 | Japan. |
| 1250798 | 10/1971 | United Kingdom. |
| 1397578 | 6/1975 | United Kingdom. |
| 1397580 | 6/1975 | United Kingdom. |
| 1401202 | 7/1975 | United Kingdom. |
| 2058109 | 4/1981 | United Kingdom. |

OTHER PUBLICATIONS

Chemical Abstract: vol. 106, #166253, 1987 Kon et al., corresponds to Japanese 61/250668.

Primary Examiner—Stephen J. Kalafut
Attorney, Agent, or Firm—Oblon, Spivak, McClelland, Maier & Neustadt

[57] ABSTRACT

A battery exhaust gas plug filter is disclosed in which surfaces of pores of an inorganic porous substance composing the filter are coated with a silane or titanium coupling agent inner film before coating them with a fluororesin outer film having finer micro-pores. Accordingly, it is believed that the fluororesin outer film having finer micro-pores comes to be tightly bonded with the surfaces of the pores of the inorganic porous substance through silane or titanium coupling agent inner film, and that even smaller pores of the inorganic porous substance are covered with the silane or titanium coupling agent inner film at least. As a result, the water repellency, gas permeability and strength of the battery exhaust gas plug filter have been improved.

15 Claims, 2 Drawing Sheets

BATTERY EXHAUST GAS PLUG FILTER AND PROCESS FOR MANUFACTURING THE SAME

BACKGROUND OF THE INVENTION

1. Field of the Invention

The present invention relates to a battery exhaust gas plug filter having water repellency, gas permeability and strength applicable enough to the practical use.

2. Description of the Prior Art

A filter comprising a lead battery exhaust plug is required to have water repellency, gas permeability and strength.

When charging a lead battery, the electrolyte decomposes electrically to generate hydrogen and oxygen gases. If the filter does not have enough gas permeability, these gases reside in the lead battery, and causes explosion and accumulation of internal pressure. Thus the electrolyte like strong acid leaks out, and apparatuses around the lead battery are damaged by corrosion.

If the filter does not have water repellency, the electrolyte might leaks out even due to a light vibration. Moreover, the filter should have strength to resist vibrations and the like.

Various filters have been investigated to satisfy these requirements. Currently, the following filter is widely used: a filter made of an inorganic substance having good anti-electrolyte property and heat resistance, such as fused alumina, silicon carbide or silica porous substance, and treated with silicon resin water repellent agent.

The water repellency of an exhaust gas plug using the filter mentioned above deteriorates due to splashing electrolyte casued by the vibrated battery. As a result, the electrolyte has leaked through the exhaust gas plug.

A process, in which a porous substance made of fused alumina is treated with water repellent fluororesin dispersion to obtain a filter, has been proposed. However, the electrolyte leaks out through the exhaust gas plug even by a light vibration. It is believed that the leakage is caused by the following reasons: The fluororesin gets together locally, solidifies and blocks some of larger pores, and the inside of smaller pores are not covered with the fluororesin at all.

Further, a filter is proposed in Japanese Examined Patent Publication (KOKOKU) No. 8510/1968 in which a porous film containing fluororesin with water repellency is formed on end surfaces of a porous substance made of fused alumina. And another filter is proposed in Japanese Unexamined Patent Publication (KOKAI) No. 161656/1986 in which a gas permeation film comprising water repellent polytetrafluoroethylene or high density polyethylene covers the top surface, the side surface or the front surface of a filter, disposed in an exhaust gas plug, comprising a porous substance made of ceramic or synthetic resin.

However, since the films obtained by these processes do not have enough gas permeability, generated gases reside in the battery. And since the films are weakly bonded to the porous substance, the films are liable to come off the porous substance and break. Consequently, the electrolyte gets into the inside of the porous substance, the pores are blocked, and the explosion of the battery might occur.

SUMMARY OF THE INVENTION

Accordingly, it is an object of this invention to provide a battery exhaust gas filter having water repellency enough to prevent the electrolyte leakage due to mechanical vibration, gas permeability enough to discharge hydrogen and oxygen gases generated by electrolysis in the battery, and strength not to be broken by mechanical vibration.

This invention relates to a battery exhaust gas plug filter comprising an inorganic porous substance having a number of pores for letting gas go through, wherein surfaces of said pores are covered with an inner film composed of silane coupling agent or titanium coupling agent, and an outer film composed of fluororesin.

The porous substance used in this invention is formed by mixing an inorganic substance, having good anti-electrolyte property and heat resistance, with a binder like glass powder and heating the mixture at a high temperature. The inorganic substance may be alumina, silicon carbide, silica, a glass fiber, a glass material, graphite, or carbon. The porous substance has gas permeability enough to discharge hydrogen and oxygen gases generated in the battery. It may be the one generally used for a battery exhaust gas plug filter.

As the silane coupling agent, the following are available: vinyltriethoxysilane, gamma-methacryloxypropyltrimethoxysilane, gamma-aminopropyltrimethoxysilane, N-beta-(aminoethly)-gamma-aminopropyl-trimethoxysilane, beta-(3,4-epoxycyclohexyl)ethlytrimethoxysilane, and gamma-glycidoxy-propyltrimethoxysilane. The above mentioned coupling agents may be used with a hydrolysis assistant.

As the titanium coupling agent, the following are available: Dihydroxy.bis(lactate)titanium, di-n-butoxy.-bis(triethanolaminate)titanium, i-propoxytitanium-tri-i-stearate, tetra-kis(2-ethylhexoxy)titanium, tetra-n-butoxytitanium, and tetra-i-propoxytitanium.

These silane coupling agents are usually dissolved into water or a mixture of water and an alcohol before use. The concentration of the silane or titanium coupling agent is preferred to fall within 0.1 to 100%, and more preferably within 0.5 to 3%. If the concentration is less than 0.1%, the thickness of silane or titanium coupling agent film formed is so thin that no satisfactory adherence between the silane or titanium coupling agent film and fluororesin film can be obtained when coating the silane or titanium coupling agent film with fluororesin dispersion.

The silane or titanium coupling agent film is formed on the surfaces of the pores as follows:

The porous substance is immersed into the above mentioned solution to fully impregnate the solution into the inside of pores. And then, the porous substance is taken out of the solution, and is dried by air. Finally, the porous substance is heated at 100° to 200° C. for 5 to 120 minutes to have the silane or titanium coupling agent reacted tightly with the porous substance.

As the fluororesin dispersion, a commercially available water repellent and heat resistance coating agent is used. The coating agent may be tetrafluoroethylene resin dispersion or tetrafluoroethylene-hexafluoropropylene copolymer resin dispersion. The fluororesin dispersion is mixed with water to obtain a dispersion of 0.1 to 50% concentration. If the concentration is 0.1% or less, the thickness of the coated film is so thin that no film having satisfactory water repellency and strength can be obtained. On the other hand, if the concentration is more than 50%, the thickness of the coated film is so thick that the pores are stuck with the fluororesin dispersion and damages gas permeability.

The porous substance coated with the silane or titanium coupling agent is immersed into the diluted dispersion of fluororesin to coat the surfaces of the pores with fluororesin outer film. Then, the porous substance is heated at 300° to 500° C. for 10 to 120 minutes in air to dry and tightly adhere the fluororesin outer film with the silane or titanium coupling agent inner film.

The fluororesin outer film may be formed on the silane or titanium coupling agent inner film by one operation when treating the surfaces of the pores of the porous substance with a mixed solution, in which one (1) part by weight of the silane or titanium coupling agent solution is mixed with 0.1 to 10 parts by weight of the diluted fluororesin dispersion.

The films are formed by immersing the porous substance into the mixed solution and impregnating the mixed solution into the porous substance. Then, the porous substance is heated at 300° to 500° C. for 10 to 120 minutes in air to dry and tightly adhere the films.

Advantages of the Invention

As shown in FIG. 1, it is believed that silane or titanium coupling agent inner film 5 and fluororesin film 6 having finer micro-pores are formed on the surfaces of larger pores 3 of an inorganic porous substance 1 composed of fused alumina or silicon carbide having anti-electrolyte property and a binder 2 like glass powder, and that at least the silane or titanium coupling agent inner film 5 is formed on the smaller pores 3a of the inorganic substance 1. It is further believed that the fluororesin neither aggregates nor solidifies locally in the pores 3 of the inorganic porous substance 1 as in the conventional plug filter, since the silane or titanium coupling agent has a strong affinity for the fluororesin. Consequently, the fluororesin is believed to cover the surfaces of the pores 3 of the inorganic porous substance 1 uniformly while forming finer micro-pores.

The conventional process, in which the porous substance is treated with the fluororesin disperion, has a drawback. Namely, as shown in FIG. 2, it is understood that the smaller pores 3a, into which the fluororesin dispersion hardly gets into, are not covered with fluororesin at all.

In this invention, as can be seen form FIG. 1, the surfaces of the pores 3 are treated with silane coupling agent or titanium coupling agent solution in advance to cover the surfaces of the pores 3 with the silane or titanium coupling agent inner film 5, which is liable to bind with fluororesin. Then, the silane or titanium coupling agent inner film 5 is covered with the fluororesin outer film 6 having finer micro-pores by using a fluororesin dispersion. Thus, it is believed that the drawback of the conventionally produced filter has been avoided since even the smaller pores 3a, into which the fluororesin dispersion hardly gets into in the conventional process, are at least covered with silane or titanium coupling agent inner film 5.

Two or more of different reactant groups are introduced into the molecule of silane or titanium coupling agent. One of the reactant groups bonds with the inorganic porous substance chemically to form a strong bonding, and the other reactant group bonds with fluororesin chemically. Consequently, the silane or titanium coupling agent works as a go-between which bonds the porous substance and fluororesin outer film 6 tightly.

It is understood that the gas permeability is so satisfactory that gases generated in the battery can be discharged to the outside completely in the battery exhaust gas plug filter of the present invention, since the exhaust gas plug obtained by this invention has an inorganic porous substance as a filter, and since the surfaces of larger pores 3 of the inorganic porous substance are coated with the silane or titanium coupling agent inner film 5 and the water repellent fluororesin outer film 6 having finer micro-pores, and since the surfaces of smaller pores 3a are coated with the silane or titanium coupling agent inner film 5 at least. It is further understood that the fluororesin covers the surfaces of the pores 3 of the inorganic porous substance uniformly without aggregating and solidifying in the pores 3 of the inorganic porous substance, since the silane or titanium coupling agent has a strong affinity for the fluororesin.

Further, since the fluororesin outer film 6 is strongly bonded to the inorganic porous substance through the silane or titanium coupling agent inner film 5, no coming off and breakage due to mechanical vibration occurs, and the water repellency can be maintained for a long period of time, and the electrolyte leakage can be prevented. Furthermore, the exhaust gas plug relating to this invention has the inorganic porous substance coated with fluororesin outer film having fine micro-pores to maintain necessary strength for the porous substance to work properly.

In addition, since only one operation is required for the coating of silane or titanium coupling agent inner film 5 and fluororesin outer film 6 when working with a mixed solution of silane or titanium coupling agent and fluororesin dispersion, this invention is effective in the saving of time and labor required for the coating of silane or titanium coupling agent inner film 5 and fluororesin outer film 6.

DETAILED DESCRIPTION OF THE PREFERRED EMBODIMENTS

Figure 1:
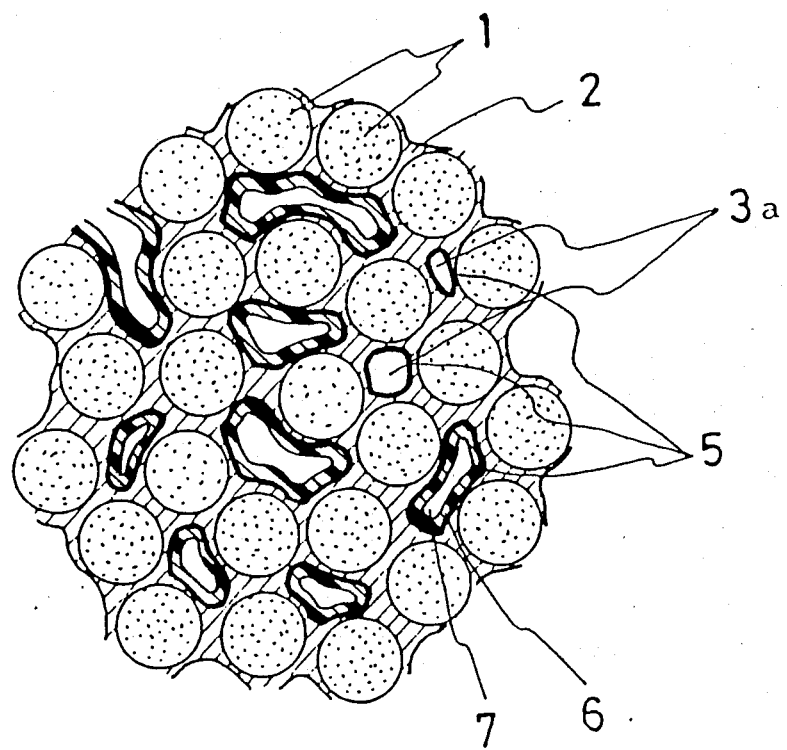
FIG. 1 is an enlarged cross-sectional view of an inorganic porous substance according to this invention which is treated with a fluororesin dispersion after treated with a silane coupling agent.
Figure 2:
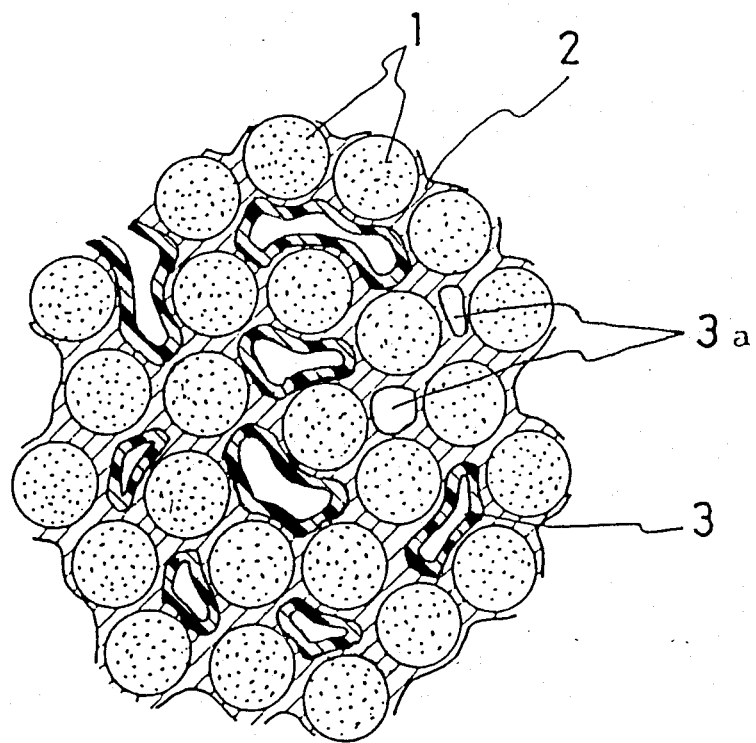
FIG. 2 is an enlarged cross-sectional view of a conventionally manufactured inorganic porous substance which is treated with a fluororesin dispersion.

The present invention will be hereinafter explained with reference to preferred embodiments.

(Embodiment 1)

Sphere alumina particles (#50) are compounded with 15% by weight of glass powder, and the mixture is molded into a desired shape ($\phi 11.5$ mm $\times$ t 4.0 mm). Then, the molded substance is heated to 1400° C. in the air to make an inorganic porous substance having the following properties:

Specific gravity: 3.53
Apparent specific gravity: 2.81
Porosity rate: 20.2%
Mean pore diameter: 169 micrometers The mean pore diameter was measured by the mercury injection method using a PORE SIZER 9310 made by Micromeritics Co., LTD., and obtained by finding a mean value of a distribution curve on the relationship between the pressure and the mercury injection amount.

The inorganic porous substance is immersed into 1% by weight of N-beta-(aminoethyl)-gamma-aminopropyl-trimethoxysilane solution using water and alcohol as the solvent to fully impregnate the solution into the inorganic porous substance. And then, the inorganic porous substance is heated at 105° C. to dry. After the impregnation, a solution of tetrafluoroethylene resin (average particle diameter: 300 micrometers) dispersion diluted to 5% by weight is impregnated into the inorganic porous substance. The impregnated inorganic porous substance is heated at 400° C. for 15 minutes to complete the baking.

(Embodiment 2)

The inorganic porous substance is treated with the same procedures as Embodiment 1 except that a hydrolysis assistant is added to N-beta-(aminoethyl)-gamma-aminopropyl-trimethoxysilane instead of using N-beta-(aminoethyl)-gamma-aminopropyl-trimethoxysilane as it is.

(Embodiment 3)

The inorganic porous substance is treated with the same procedures as Embodiment 1 except that vinyltriethoxysilane is used instead of N-beta-(aminoethyl)-gamma-aminopropyl-trimethoxysilane.

(Embodiment 4)

The inorganic porous substance is treated with the same procedures as Embodiment 1 except that dihydroxy.bis(lactate)titanium is used instead of N-beta-(aminoethyl)-gamma-aminopropyl-trimethoxysilane.

(Embodiment 5)

One (1) % by weight of N-beta-(aminoethyl)-gamma-aminopropyl-trimethoxysilane solution is added to 5% by weight of diluted tetrafluoroetylene dispersion solution to make a mixed solution. The inorganic porous substance manufactured as in Embodiment 1 is immersed into the mixed solution to fully impregnate the mixed solution. Then, the inorganic porous substance is heated at 400° C. to complete the baking.

(Comparative Example 1)

The inorganic porous substance manufactured as in Embodiment 1 is immersed into 5% by weight of diluted solution of tetrafluoroethylene dispersion to fully impregnate the solution. Then, the inorganic porous substance is heated at 400° C. to complete the baking.

(Comparative Example 2)

Comparative Example 2 is a filter taken out of a battery now commercially available. The filter is a ceramic porous substance composed of mullite particles. It is treated with dimethylpolysiloxane, one of silicon water repellent agents, to make it water repellent.

(Evaluation)

The following evaluation was performed on the above mentioned filters to evaluate their anti-electrolyte properties:

The filters were immersed into sulfuric acid of 37% concentration at 80° C. for 720 hours. Then, they were mounted on a passenger car after washing and drying. And the electrolyte leakage was examined after driving the passenger car on a rough road test course for 1 hour.

The results of the electrolyte leakage evaluation are shown in Table 1.

Table 1

|  | Precoating Agent | Water Repellent Agent | Results of Electrolyte Vibration Leakage Test | |
|---|---|---|---|---|
|  |  |  | Before Anti-acid Test | After Anti-acid Test |
| Embodiment 1 | N—beta-(aminoethyl)-gamma-amino propyl-tri methoxysilane | Tetrafluorethylene | Good | Good |
| Embodiment 2 | N—beta-(aminoethyl)-gamma-amino propyl-tri methoxysilane with a hydrolysis assistant | Tetrafluoroethylene | Good | Good |
| Embodiment 3 | Vinyltri ethoxysilane | Tetrafluoroethylene | Good | Good |
| Embodiment 4 | Dihydroxy · bis (lactate) titanium | Tetrafluoroethylene | Good | Good |
| Embodiment 5 | N—beta-(aminoethyl)-gamma-amino propyl-tri methoxysilane | Tetrafluoroethylene | Good | Good |
| Comparative Example 1 | None | Tetrafluorethylene | Bad | Bad |
| Comparative Example 2 | None | Dimethylpolysiloxane | Good | Bad |

Embodiments 1 through 5 show sufficient anti-leakage properties even after the anti-acid test. Although Comparative Example 1 employs the same water repellent agent, namely tetrafluoroethylene, as used in Embodiments 1 through 5, it does not have anti-leakage property. It is understood that the tetrafluoroethylene dispersion did not get into smaller pores of the inorganic porous substance when making Comparative Example 1. It is also understood that Embodiments 1 through 5 show favorable anti-leakage properties since the tetrafluoroethylene outer film having finer micro-pores has been formed on larger pores and at least silane or titanium coupling agent inner film has formed on smaller pores. It is further understood that the fluororesin covers the surfaces of the pores of the inorganic porous substance uniformly in Embodiments 1 through 5 without aggregating and solidifying in the pores of the inorganic porous substance, since the silane or titanium coupling agent has a strong affinity for the fluororesin.

As it is well known, tetrafluoroethylene has the best chemical resistance property among resins. These favorable performances of Embodiments 1 through 5 result from the good chemical resistance property of tetrafluoroehtylene. On the other hand, Comparative Example 2 has sufficient anti-leakage property before the anti-acid test, however its anti-leakage property deteriorates due to the anti-acid test. This is because sulfuric acid decomposes dimethylsiloxane used in Comparative Example 2 as its water repellent agent. Accordingly, such filter employing dimethylsiloxane as its water repellent agent is not appropriate for an exhaust gas plug filter of a lead battery in which strong acid like sulfuric acid is used as an electrolyte.

What is claimed is:

1. A porous battery exhaust gas plug filter having reduced electrolyte leakage therefrom, comprising:
   an inorganic porous body having a number of pores for letting gas go through;
   wherein surfaces of said pores are covered with an inner film composed of a silane coupling agent or a titanium coupling agent, and an outer film composed of a fluororesin consisting of repeating units of carbon and fluorine.

2. The battery exhaust gas plug filter according to claim 1, wherein said silane coupling agent is selected from the group consisting of vinyltriethoxysilane, gamma-methacryloxy-propyltrimethoxysilane, gamma-aminopropyltrimethoxysilane, N-beta-(aminoethly)-gamma-aminopropyl-trimethoxysilane, beta-(3,4-epoxycyclohexyl)ethlytrimethoxysilane and gamma-glycidoxy-propyltrimethoxysilane.

3. The battery exhaust gas plug filter according to claim 1, wherein said titanium coupling agent is selected from the group consisting of dihydroxy.bis(lactate)-titanium, di-n-butoxy.bis(triethanolaminate)titanium, i-propoxytitanium-tri-i-stearate, tetra-kis(2-ethylhexoxy)titanium, tetra-n-propoxytitanium and tetra-i-propoxytitanium.

4. The battery exhaust gas plug filter according to claim 1, wherein said fluororesin is selected from the group consisting of tetrafluoroethylene resin and copolymer resin of tetrafluoroethylene and hexafluoropropylene.

5. A process for manufacturing a porous battery exhaust gas plug filter having reduced electrolyte leakage therefrom, comprising:
   (a) forming an inner film on surfaces of pores of an inorganic porous body for letting gas go through with a silane coupling agent or a titanium coupling agent, and then
   (b) forming an outer film on said inner film with a dispersion of a fluororesin consisting of repeating units of carbon and fluorine.

6. The process for manufacturing a battery exhaust gas plug filter according to claim 5, wherein said silane coupling agent or titanium coupling agent is dissolved into water or a mixture of water and an alcohol in an amount from 0.5 to 3% by weight, and said fluororesin dispersion is mixed with water in an amount from 0.1 to 50% by weight.

7. A process for manufacturing a porous battery exhaust gas plug filter having reduced electrolyte leakage therefrom, comprising:
   (a) mixing a silane coupling agent or a titanium coupling agent with a dispersion of a fluororesin consisting of repeating units of carbon and fluorine to obtain a mixed dispersion; and then
   (b) forming an inner film and outer film on surfaces of pores of an inorganic porous body for letting gas go through said mixed dispersion.

8. The process for manufacturing a battery exhaust gas plug filter according to claim 7, wherein said mixed solution contains 1 part by weight of silane coupling agent or titanium coupling agent, and from 0.1 to 10 parts by weight of a diluted solution of fluororesin dispersion.

9. The process for manufacturing a battery exhaust gas plug filter according to claim 8, wherein a concentration of said diluted solution of fluororesin dispersion is 5% by weight.

10. The battery exhaust gas plug filter according to claim 1, wherein said inorganic porous body is formed by mixing alumina, silicon carbide, silica, glass fiber, glass material, graphite or carbon with a binder and heating the mixture to form said body.

11. The process for manufacturing a battery exhaust gas plug filter according to claim 5, wherein said inner film is formed by immersing said inorganic porous body into said silane or titanium coupling agent having a concentration in the range of 0.5 to 3% by weight, thereby impregnating said solution into the pores of said porous body, and then heating said porous body at a temperature of about 100° to 200° C. for about 5 to 120 minutes.

12. The process for manufacturing a battery exhaust gas plug filter according to claim 5, wherein said outer film is formed by immersing said inorganic porous body having said inner film coated thereon into said fluororesin dispersion having a fluororesin concentration of about 0.1 to 50% by weight, thereby coating the pore surfaces with a fluororesin outer film, then heating said porous body at a temperature of about 300° to 500° C. for about 10 to 120 minutes.

13. The process for manufacturing a battery exhaust gas plug filter according to claim 5, wherein said silane coupling agent is selected from the group consisting of vinyltriethoxysilane, gamma-methacryloxypropyl-trimethoxy-silane, gamma-aminopropyltrimethoxysilane, N-beta-(aminoethyl)-gamma-aminopropyl-trimethoxysilane, beta-(3,4-epoxycyclohexyl)ethyl trimethoxysilane and gamma-glycidoxy-propyltrimethoxysilane.

14. The process for manufacturing a battery exhaust gas plug filter according to claim 5, wherein said titanium coupling agent is selected from the group consisting of dihydroxy bis(lactate) titanium, di-n-butoxy bis(triethanolaminate) titanium, i-propoxytitanium-tri-i-stearate, tetra-kis(2-ethylhexoxy) titanium, tetra-n-propoxytitanium and tetra-i-propoxytitanium.

15. The battery exhaust gas plug filter according to claim 1, wherein said inorganic porous body is formed by mixing alumina, silicon carbide, silica, glass fiber, glass material, graphite or carbon with a binder and heating the mixture to form said body.

* * * * *